(12) United States Patent
Wilker et al.

(10) Patent No.: US 12,344,775 B2
(45) Date of Patent: *Jul. 1, 2025

(54) ADHESIVE COMPOSITIONS MADE FROM PLANT PROTEIN AND PHENOLICS

(71) Applicant: Purdue Research Foundation, West Lafayette, IN (US)

(72) Inventors: Jonathan James Wilker, West Lafayette, IN (US); Gudrun Schmidt, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,810

(22) Filed: Oct. 4, 2023

(65) Prior Publication Data

US 2024/0026197 A1 Jan. 25, 2024

Related U.S. Application Data

(63) Continuation of application No. 16/491,200, filed as application No. PCT/US2018/026837 on Apr. 10, 2018, now Pat. No. 11,820,924.

(60) Provisional application No. 62/484,868, filed on Apr. 12, 2017.

(51) Int. Cl.
*C09J 189/00* (2006.01)

(52) U.S. Cl.
CPC .................. *C09J 189/00* (2013.01)

(58) Field of Classification Search
CPC .............................. C09J 189/00; C08L 89/00
See application file for complete search history.

(56) References Cited

U.S. PATENT DOCUMENTS

| | | |
|---|---|---|
| 2,938,822 A | 5/1960 | Nelson |
| 2010/0258033 A1 | 10/2010 | Yang |
| 2013/0065012 A1 | 3/2013 | Parker |

FOREIGN PATENT DOCUMENTS

| | | |
|---|---|---|
| WO | 2015092750 A1 | 6/2015 |
| WO | 2017074841 A1 | 5/2017 |

OTHER PUBLICATIONS

Ferdosian, F., Bio-Based Adhesives and Evaluation for Wood Composites Application, Polymers 2017, 9, 70.
Corradini, E., "Recent Advances in Food-Packing," Pharmaceutical and Biomedical Applications of Zein and Zein-Based Materials, Int. J. Mol. Sci. 2014, 15, 22438-22470.
Pizzi, A. et al., "Fast vs. Slow-Reacting Non-Modifieid Tannin Extracts for Exterior Particleboard Adhesvies," 52 Holz als Roh- und Werkstoff 218 (1994).
Shukla, R. et al., "Zein: the Industrial Protein from Corn," 13 Industrial Crops and Products 171 (2001).

*Primary Examiner* — Liam J Heincer
(74) *Attorney, Agent, or Firm* — Purdue Research Foundation

(57) ABSTRACT

The present disclosure relates to adhesive compositions made from the reaction product of plant protein and phenolics, and method of making and using the adhesive compositions. A maximum bonding strength of 7.8±1.5 MPa was obtained using only 1 weight % tannic acid in a zein matrix of pH=7 and cured in 120° C.

7 Claims, No Drawings

ADHESIVE COMPOSITIONS MADE FROM PLANT PROTEIN AND PHENOLICS

CROSS-REFERENCE TO RELATED APPLICATION

The present patent application is a Continuation Application of U.S. application Ser. No. 16/491,200, filed Sep. 5, 2019, which is a 35 U.S.C. § 371 national phase application of PCT/US2018/026837, filed Apr. 10, 2018, which is related to and claims the priority of U.S. Provisional Application No. 62/484,868, filed Apr. 12, 2017, the contents of which are hereby incorporated by reference in their entireties into this application.

TECHNICAL FIELD

The present disclosure relates to adhesive compositions made from plant protein and phenolics, and method of making and using the adhesive compositions.

BACKGROUND

This section introduces aspects that may help facilitate a better understanding of the disclosure. Accordingly, these statements are to be read in this light and are not to be understood as admissions about what is or is not prior art.

Every day people are surrounded and exposed to toxic glues that keep car parts together, houses and furniture in place, and books and cardboard boxes together. Since there is no viable alternative, people use toxic adhesives to keep cell phones working, make shoes and carpets flexible, nails polished and baby food packaged. The toxic chemistries of epoxies, urethanes, acrylates, and cyanoacrylate glues are used to make amazing products but people pay a price by being exposed to leaching chemicals. Almost none of these adhesives are approved for medical applications inside the human body.

Consequently, non-toxic or lower toxic adhesives are needed that will make everyday life less polluted and ease the environmental burden for future generations. Whenever possible, alternative adhesives should be made from non-toxic or lower toxic materials found in nature. Food-based materials such as proteins and carbohydrates combined with phenolic components are ideal candidates. Nature offers clues on how to make adhesives that are non-toxic wet-setting and very strong. For example, mussels, oysters and other edible sea creatures produce adhesives to keep themselves in place.

Therefore, there remains a need to develop adhesive compositions with lower toxic starting materials that can be easily obtained from natural sources such as food components.

SUMMARY

One of the primary objectives of the present disclosure is to develop strong adhesive compositions from less toxic starting materials that are easily available from natural sources such as food and/or plants.

In one embodiment, the present disclosure provides an adhesive composition comprising a reaction product, wherein the reaction product is formed by the reaction of a mixture comprising at least one plant protein and at least one phenolic material.

In another embodiment, the present disclosure provides a process of preparing an adhesive composition comprising a reaction product, wherein the reaction product is formed by the reaction of a mixture comprising at least one plant protein and at least one phenolic material, wherein the process comprises:
  a) dissolving the at least one plant protein in an organic solvent or an aqueous solvent, or a combination of an organic solvent and an aqueous solvent, to form a plant protein solution; and
  b) contacting the plant protein solution with the at least one phenolic material to provide the adhesive composition.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure, the term "plant protein" may refer to ground plant meals or isolated polypeptide compositions.

Plant meals can be obtained from commercial sources or derived from corn, wheat, sunflower, cotton, rapeseed, canola, castor, soy, camelina, flax, jatropha, mallow, peanuts, algae, sugarcane bagasse, tobacco, whey, or a combination thereof. Plant meals can be ground using techniques known in the an, such as hammer mill (cryogenic or ambient) or ball mill. In certain embodiments, the plant meal is ground and screened to isolate plant meal particles having a particle size in the range of from about 1 µm to about 400 µm, from about 1 µm to about 350 µm, from about 1 µm to about 300 µm, from about 1 µm to about 250 µm, from about 1 µm to about 200 µm, from about 1 µm to about 100 µm, from about 1 µm to about 50 µm, from about 5 µm to about 250 µm, from about 5 µm to about 200 µm, from about 5 µm to about 150 µm, from about 5 µm to about 100 µm, from about 5 µm to about 50 µm, from about 10 µm to about 250 µm, from about 10 µm to about 100 µm, from about 10 µm to about 90 µm, from about 10 µm to about 70 µm, from about 10 µm to about 50 µm, from about 20 µm to about 150 µm, from about 20 µm to about 100 µm, from about 20 µm to about 80 µm, from about 20 µm to about 70 µm, from about 20 µm to about 60 µm, from about 25 µm to about 150 µm, from about 25 µm to about 100 µm, from about 25 µm to about 50 µm, from about 50 µm to about 150 µm, or from about 50 µm to about 100 µm. In certain embodiments, the plant meal is ground and has a particle size in the range of from about 1 µm to about 200 µm. In certain other embodiments, the plant meal is ground and has a particle size in the range of from about 1 pin to about 100 µm.

The isolated polypeptide composition can be derived from renewable plant biomass, such as corn, wheat, sunflower, cotton, rapeseed, canola, castor, soy, camelina, flax, jatropha, mallow, peanuts, algae, sugarcane bagasse, tobacco, whey, sorghum (kafirin), or a combination thereof.

In the present disclosure, one preferred plant protein is zein. The term "zein" in the present disclosure refers to a prolamine, which is an alcohol-soluble protein present in corn.

In the present disclosure, the term "phenolic compound" or "phenolics" refers to materials with chemical structure that has at least one aromatic ring with one or more hydroxyl groups attached to the aromatic ring. The "phenolic compound" or "phenolics" may also include polyphenolics, which may have more than one aromatic rings with one or more hydroxyl groups attached to the more than one aromatic rings.

In the present disclosure, the term "reaction product" may be the chemical reaction product, which means new chemical entity is formed by the reaction of a plant protein and phenolics. The term "reaction product" may also refer to the achieved mixture that may not be the product of chemical reaction and may not have different chemical entity formed. Nevertheless, the achieved mixture may show different physical characteristics such as different adhesion. For example, the "reaction product" in the present disclosure may refer to new chemical entity due to crosslink reaction between zein and phenolics, which is a chemical reaction process; or refer to a mixture that demonstrates higher adhesion while there may not have new chemical entity due to actual chemical reaction.

In the present disclosure, the term "aqueous solvent" may refer to pure water or aqueous solution comprising acid or base that provides desired pH value.

Many plant-based foods contain protein and phenolic components that are covalently bound together like glue. When extracting the phenolic components from plants, these molecules often have to be broken apart from a protein or carbohydrate network structure, thus covalent bonding has to be broken. Plant-based phenolics may have a catechol component built into their molecular structures. This type of component is frequently found in nature whenever adhesion takes place. Based on these similarities, it may be expected that plant based adhesives made from protein and phenolics may have inherent adhesive and possible wet setting properties that can be further enhanced through formulation. However, it is not predictable if such adhesive can be a strong adhesive especially on wet surface and have reasonable water resistance.

Therefore, one of the objectives of the present disclosure is to develop a strong adhesive from naturally occurred and less toxic starting materials. Another objective is to provide an adhesive suitable for adhering material that uses preferably formaldehyde free or can be used to reduce formaldehyde emission.

In one embodiment, the present disclosure provides an adhesive composition comprising a reaction product, wherein the reaction product is formed by the reaction of a mixture comprising at least one plant protein and at least one phenolic material. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the at least one phenolic material has a chemical structure moiety that comprises at least two hydroxyl groups directly bonded to two carbons of an aromatic ring, wherein one of the hydroxyl groups may be optionally alkylated with a C1-C3 alkyl. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the at least one phenolic material has a chemical structure moiety that comprises at least two hydroxyl groups directly bonded to two neighboring carbons of an aromatic ring, wherein one of the hydroxyl groups may be optionally alkylated with a C1-C3 alkyl. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the at least one phenolic material may be but is not limited to catechol, vanillin, gallic acid, caffeic acid, juglone, 3,4-dihydroxy-benzoic acid, catechin, 3,4-dihydroxy benzaldehyde, quercetin, tannic acid, or any combination thereof. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the at least one phenolic material is selected from the group consisting of catechol, vanillin, gallic acid, caffeic acid, juglone, 3,4-dihydroxy-benzoic acid, catechin, 3,4-dihydroxy benzaldehyde, quercetin, tannic acid, and any combination thereof. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the at least one phenolic material is catechol. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the weight percentage of the at least one plant protein is 50-99 wt %, the total weight percentage of phenolic material is 1-50 wt %. In one aspect, the weight percentage of the at least one plant protein is 60-99 wt %, the total weight percentage of phenolic material is 1-40 wt %. In one aspect, the weight percentage of the at least one plant protein is 70-99 wt %, the total weight percentage of phenolic material is 1-30 wt %. In one aspect, the weight percentage of the at least one plant protein is 80-99 wt %, the total weight percentage of phenolic material is 1-20%. In one aspect, the weight percentage of the at least one plant protein is 90-99 wt %, the total weight percentage of phenolic material is 1-10 wt %. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the combined weight percentage of the total plant protein and the total phenolic material constitutes at least 90% of the total weight of the adhesive composition. In one aspect, the combined weight percentage of the total plant protein and the total phenolic material constitutes at least 95% of the total weight of the adhesive composition. In one aspect, the combined weight percentage of the total plant protein and the total phenolic material constitutes at least 98% of the total weight of the adhesive composition. In one aspect, the combined weight percentage of the total plant protein and the total phenolic material constitutes at least 99% of the total weight of the adhesive composition. In one aspect, the combined weight percentage of the total plant protein and the total phenolic material constitutes 100% of the total weight of the adhesive composition.

In one embodiment, the present disclosure provides an adhesive composition comprising a reaction product, wherein the reaction product is formed by the reaction of a mixture comprising at least one plant protein and at least one phenolic material, wherein the mixture is free or substantially free of aldehyde. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the mixture is free or substantially free of formaldehyde. In one aspect, the at least one plant protein is zein.

In one embodiment, the present disclosure provides an adhesive composition comprising a reaction product, wherein the reaction product is formed by the reaction of a mixture comprising at least one plant protein and at least one phenolic material, wherein the adhesive has an adhesion value of at least 1.5 MPa. In one aspect, the adhesive has an adhesion value of at least 2 MPa. In one aspect, the adhesive has an adhesion value of at least 3 MPa. In one aspect, the adhesive has an adhesion value of at least 4 MPa. In one aspect, the adhesive has an adhesion value of at least 5 MPa. In one aspect, the adhesive has an adhesion value of at least 6 MPa. In one aspect, the adhesive has an adhesion value of 1.5-10 MPa. In one aspect, the adhesive has an adhesion value of 2-10 MPa. In one aspect, the adhesive has an adhesion value of 3-10 MPa. In one aspect, the adhesive has an adhesion value of 4-10 MPa. In one aspect, the adhesive has an adhesion value of 5-10 MPa. In one aspect, the at least one plant protein is zein.

In any embodiment regarding an adhesive composition, wherein the composition may further comprise an oxidant. The oxidant may be but is not limited to sodium periodate, tetrabutylammonium periodate, iron(III) nitrate, iron(III) acetonylacetonate, potassium permanganate, di-tert-butyl peroxide, hydrogen peroxide, cumene hydroperoxide, 2-butanone hydroperoxide, potassium ferrate, chromate, dichromate, or any combination thereof.

In another embodiment, the present disclosure provides a process of preparing an adhesive composition, wherein the process comprising:
a) dissolving at least one plant protein in an organic solvent or an aqueous solvent, or a combination of an organic solvent and or an aqueous solvent, to form a plant protein solution; and
b) contacting the at least one plant protein solution with at least one phenolic material to provide the adhesive composition.

In one aspect, the at least one plant protein in the process is zein.

In another embodiment, the present disclosure provides a process of preparing an adhesive composition comprising a reaction product, wherein the reaction product is formed by the reaction of a mixture comprising at least one plant protein and at least one phenolic material, wherein the process comprises:

a) dissolving at least one plant protein in at least an organic solvent or an aqueous solvent, or a combination of an organic solvent and an aqueous solvent, to form a plant protein solution; and
b) contacting the at least one plant protein solution with at least one phenolic material to provide the adhesive composition,
wherein the organic solvent is ethanol.

In one aspect, the plant protein in the process is zein. In one aspect, the at least one phenolic material is tannic acid or catechol.

Example 1: An Adhesive Composition of Zein

Zein solution was prepared from 7.4 g zein powder (Sigma Aldrich), 6 g ethanol and 3 g of deionized water. Sample preparation was done in two steps to allow for full dissolution of the zein protein. First 5 g of zein were dissolved in 6 g of ethanol and 3 g of deionized water and hand mixed until no large aggregates were visible to the eye. The resulting dispersion was opaque but the zein dissolved into a clear yellow-brown solution overnight. After 24 hours, 2.4 g of zein powder were added and mixed. Another 24 hours were sufficient to dissolve the zein completely and form a clear, amber colored, and high viscous solution that can pull fibers when touched with a spatula. Two days were needed to prepare zein solutions used for making adhesives and generating adhesion data that are reproducible.

Example 2-11: Adhesive Compositions of Zein and Phenolics

To make adhesives from phenolics, various phenolic components and zein solution were used. About 2.8 g of the zein solution made as Example 1 was manually mixed with 0.08 g of phenolic component (usually powder). If the mixture yielded a clear high viscous solution or gel by manual mixing (e.g. for vanillin), this mixture was used as adhesive directly. If however, the phenolic powder did not field a clear solution while mixing, ethanol and water were added drop wise until the zein-phenolic solution became clear (e.g., for most phenolics). The added solvent was left to evaporate until the adhesive became high viscous and was pulling fibers. For juglone, which is only sparingly soluble in water, more than 20 drops of ethanol and water had to be added and the solution had to be mixed for at least 20 minutes. After the additional solvent evaporated, a dark red but clear zein-juglone solution was obtained. The cured and dried zein-juglone adhesive was black and brittle. Quercetin did not give a clear solution when hand mixed with zein but appeared to be homogeneously mixed. Thus the opaque zein-quercetin solution was used as is. After curing at 100° C. and drying (see below), this adhesive became clear and yellow. The composition of all dried and cured zein-phenolic adhesives included about 94 weight % of Zein and 6 weight % of phenolic component.

Zein-catechol adhesives at high catechol concentrations were made from zein solutions and saturated catechol solutions or catechol powder. The solubility of catechol in water is about 430-517 g/L at 20° C. Catechol solution was mixed drop-wise with zein solution and the solvent was left to evaporate until the adhesive pulled fibers when touched with a spatula. The adhesive was then applied and spread onto the etched aluminum adherents, then overlapped and glued together. Alternatively, the glue could also be mixed on the adherent directly overlapped, and glued together. After removing additional solvent during curing at 100° C., dried zein based adhesives could be generated containing catechol as high as 20 weight %.

Adhesive Preparation and Curing

For adhesion testing, the zein-phenolic adhesives were cured and dried at room temperature for about 1 h (about, 22 degree ° C., room temperature) followed by drying at 100-110° C. for about 24 hours. Before adhesion testing was done, adhesives were cooled and kept at room temperature for about one hour. Samples were inspected for bubbles as well as dried, leaked-out adhesive on the sides of the adherents. Between 5 and 10 adherents were prepared for each composition and results were averaged. Adherents with visible large bubbles inside the overlapped area or with missing adhesive at the edges were also tested but data were not used for data averaging.

Adhesion Testing

To evaluate adhesion, standard lap shear testing was used. Adhesion testing was done using an Instron 5544 Materials Testing System with a 2000 N load cell. A modified ASTM D1002 standard including single lap joint Aluminum specimens (adherents) allowed for optimized testing within the instrument range. See Meredith H J, Jenkins C L, Wilker J J. Enhancing the Adhesion of a Biomimetic Polymer Yields Performance Rivaling Commercial Glues. *Adv Funct Mater*, 2014; 24:3259-67. The area that overlapped two adherents in a single lap-shear configuration was 1.2×1.2 cm.

Adhesion test result from lap-shear testing of zein-based glues as function of catechol concentration was obtained. All compositions investigated are more adhesive than the zein-only control. Increasing catechol concentration leads to increased adhesion properties until a very broad plateau is reached. The strongest adhesion within the plateau region was found for glues containing 15 weight % of catechol at about 6 MPa. This adhesive strength is roughly comparable to that of commercial Super Glue when used on etched aluminum adherents. Increasing catechol concentration above about 5-6 weight % may not lead to predictable trends in adhesion for the zein-catechol formulations. Based on testing data, the zein-only adhesive is not a very good adhesive when used on etched aluminum. Addition of catechol, however, transforms this protein into a material with performance comparable to Super Glue.

For each sample composition, data from at least rive specimen were collected. Averaged data and standard deviations were reported in Table 1.

TABLE 1

Zein/phenolic compositions and adhesion test results*

| Example No. | Zein/Phenolic Component | Adhesion MPa |
|---|---|---|
| 1 | Zein Control | 1.05 ± 0.45 |
| 2 | Zein/3,4-Dihydroxy-Benzoic Acid | 2.01 ± 0.97 |
| 3 | Zein/Tannic Acid | 2.42 ± 1.13 |
| 4 | Zein/3,4-Dihydroxy Benzaldehyde | 2.85 ± 1.17 |
| 5 | Zein/Gallic Acid | 2.87 ± 0.70 |
| 6 | Zein/Vanillin | 3.27 ± 0.37 |
| 7 | Zein/Juglone | 3.39 ± 0.93 |
| 8 | Zein/Quercetin | 3.44 ± 0.98 |
| 9 | Zein/Caffeic Acid | 3.47 ± 0.52 |
| 10 | Zein Catechin Hydrate | 3.70 ± 0.97 |
| 11 | Zein/Catechol | 4.86 ± 0.97 |
| 12** | Zein/Tannic Acid | 7.80 ± 1.5 |
| 13*** | Zein/Tannic Acid/NaIO$_4$ | 7.90 ± 1.5 |
| 14**** | Zein/Catechol | 7.50 ± 0.7 |

*All dried and cured zein-phenolic adhesives included about 94 weight % of Zein and 6 weight % of phenolic component.
**Obtained using 1 weight % tannic acid in a 99 wt % zein matrix of pH = 7 and cured at 120° C.
***Obtained using 1 wt % tannic acid in a 99 wt % zein matrix of pH = 7 and cured at 120° C. The oxidant reagent NaIO4 is 0.1 wt % of the total composition of Zein/Tannic Acid/NaIO$_4$.
****Obtained using 84 wt % zein and 16 wt % catechol at pH > 7 (more like pH = 8) and cured at 110° C.

Enhancing Performance Via pH Control

The pH of an adhesive precursor solution can be used to generate conditions that either favor, delay or inhibit oxidation of the phenolic component within. Briefly, catechol compounds are most stable in acidic solutions and oxidize when exposed to base. Oxidation can be the first step when cross-linking polymer chains, thereby influencing curing. Controlled oxidation is also critical for adjusting or extending the shelf life of a glue. Small phenolic molecules such as catechol or gallic acid can oxidize at high pH when in the presence of oxygen. Thus adhesive precursor solutions made from polymers and small phenolic molecules may yield greater performance when cross-linked and cured at high pH, but only when done so in a controlled fashion. High molecular weight phenolics such as tannic acid are found to be less susceptible to oxidation than their monomeric counterparts. When tannic acid powder was mixed with a pH=7 zein solution, the resulting transparent and yellow adhesive precursor had a pH of 4-5. This change in pH came from the acidic nature of tannic acid. Depending on the plant source, the number of gallic acid units within tannic acid may vary between 2 and 12, thus the exact composition of tannic acids varies also. The resulting data measured at 3 different pH values (pH=5, 7 and 9) suggested that precursor solutions with a pH=7 bring about cured adhesives with the highest bonding capabilities for zein/tannic acid compositions. (Examples 12 and 13).

Enhancing Performance Via Temperature Changes

The curing temperature of an adhesive precursor solution can be used to enhance or delay solvent evaporation, initiate oxidation or tune the degree of cross-linking for phenolic components. Depending on the application, curing may be most practical at room temperature for school and office applications. Curing temperatures around 37° C. would be desirable for biomedical uses including surgeries and wound healing. Higher temperatures might be best where sterile environments are needed for food and medical packaging or also for manufacturing structures including metal-metal joinery as well as making plywood. It was examined how temperature may influence adhesion of compositions having 99 weight % zein and 1 weight % tannic acid. The increase in adhesion strength was quite linear up to 120° C. The growing error bars at higher temperatures may be related to the observed formation of small bubbles during curing. Curing at 160° C. demonstrated a decrease in adhesion strength and formation of a dark brown, brittle glue that broke into powdery crumbs upon fracturing.

Oxidative Crow-Linking of Zein-Tannic Acid Adhesives

The zein-tannic acid adhesive composition (99 weight % zein-1 weight % tannic acid) was combined with the strong oxidant sodium periodate (NaIO$_4$). For better comparison 0.1 wt % NaIO$_4$ was added to each glue: i) 99 weight % zein, 1 weight % tannic acid, ii) 99 weight % zein. 1 weight % gallic acid and iii) zein control, i.e. 100 weight % zein. The strongest starting adhesive was not made stronger with additional $NaIO_4$ cross-linking, nor was the zein-gallic acid control or the zein control. However inclusion of $NaIO_4$ prevented the glues from leaking and improved handling significantly, thus adding some practical benefits.

To compare the adhesion of zein/catechol and Super Glue®, similar adhesion tests were carried out. The optimized zein-catechol adhesive (87 wt % zein and 13 wt % of catechol) shows adhesion value of 7.49 (±0.66) MPa on wet surface. Although Super Glue demonstrated the adhesion value of 8.39 ((±1.04) MPa on dry surface, it only has the adhesion value of 3.55 ((±1.68) MPa on wet surface.

Water Resistance Test

For determining the water resistance and wet adhesion, zein-only and selected zein-catechol adherents with 5.3 wt % and 9.9 wt % catechol were kept under water at 37° C. for 24 hours. Adhesion testing was done right after the adherents were removed from the water bath. Many of the zein-only adherents broke prior to adhesion testing. The zein-only control became rubbery under water while the catechol containing zein adhesives developed elastomeric properties. For comparison, the dried adhesives were brittle. During adhesion testing the wet zein-catechol glue elongated like a chewing gum. Adhesion measured right after removing adherents from the water significantly dropped from 1.1 MPa measured in the dry state to 0.2±0.1 MPa when the zein-only adherent was kept under water. Adhesion dropped from 4.6 MPa in the dry state to 0.3±0.2 MPa when under water (for zein-catechol 5.3 wt %) and from 5.1 MPa in the dry state to 1.2±0.8 MPa under water (for zein-catechol 9.9 wt %). These data suggest that the adhesive still holds after being 24 hours under water although the adhesion is not as good as in the dry state.

Those skilled in the art will recognize that numerous modifications can be made to the specific implementations described above. The implementations should not be limited to the particular limitations described. Other implementations may be possible.

The invention claimed is:

1. An adhesive composition consisting of (i) as the only plant protein, either zein or soy, and (ii) as the only phenolic material, catechol, vanillin, caffeic acid, juglone, 3,4-dihydroxy-benzoic acid, 3,4-diyhydroxy benzaldehyde, or any combination thereof, alone or in further combination with an oxidant selected from sodium periodate and tetrabutylammonium periodate.

2. The adhesive composition of claim 1, wherein a hydroxyl group in the phenolic material is a free hydroxyl group.

3. The adhesive composition of claim 1, wherein a hydroxyl group in the phenolic material is alkylated with a C1-C3 alkyl.

4. The adhesive composition of claim 1, wherein the weight percentage of the phenolic material is 1-30%, and the weight percentage of the plant protein is 70-99%.

5. The adhesive composition of claim 1, wherein the adhesive composition has an adhesion value of 2-10 MPa.

6. A process of preparing an adhesive composition comprising consisting of (i) as the only plant protein, either zein or soy, and (ii) as the only phenolic material, catechol, vanillin, caffeic acid, juglone, 3,4-dihydroxy-benzoic acid and 3,4-diyhydroxy benzaldehyde or any combination thereof, alone or in further combination with an oxidant selected from sodium periodate and tetrabutylammonium periodate, wherein the process comprises:

a) dissolving the plant protein in an organic solvent or an aqueous solvent, or a combination of an organic solvent and an aqueous solvent, to form a plant protein solution; and b) contacting the plant protein solution with the phenolic material to provide the adhesive composition.

7. The process of claim 6, wherein the organic solvent is ethanol.

* * * * *